United States Patent
Oster et al.

(10) Patent No.: US 7,836,224 B2
(45) Date of Patent: Nov. 16, 2010

(54) METHOD AND SYSTEM FOR TRANSMITTING DATA OF A DATA TYPE TO BE TRANSMITTED CYCLICALLY AND OF A DATA TYPE WHICH CAN BE TRANSMITTED ACYCLICALLY VIA A COMMON TRANSMISSION CHANNEL

(75) Inventors: Viktor Oster, Blomberg (DE); Joachim Schmidt, Horn-Bad Meinberg (DE)

(73) Assignee: Phoenix Contact GmbH & Co. KG (DE)

( * ) Notice: Subject to any disclaimer, the term of this patent is extended or adjusted under 35 U.S.C. 154(b) by 816 days.

(21) Appl. No.: 11/683,986

(22) Filed: Mar. 8, 2007

(65) Prior Publication Data

US 2007/0263733 A1    Nov. 15, 2007

(30) Foreign Application Priority Data

Mar. 10, 2006    (DE) .................... 10 2006 011 524

(51) Int. Cl.
G06F 3/00        (2006.01)
G06F 13/00       (2006.01)

(52) U.S. Cl. ............................. 710/33; 710/30; 710/35

(58) Field of Classification Search .............. 710/33, 710/30, 35
See application file for complete search history.

(56) References Cited

U.S. PATENT DOCUMENTS

| | | | |
|---|---|---|---|
| 4,593,282 A * | 6/1986 | Acampora et al. | .......... 370/447 |
| 5,321,694 A | 6/1994 | Chang et al. | |
| 5,327,428 A | 7/1994 | Van As et al. | |
| 5,682,384 A * | 10/1997 | Zarros | ................. 370/394 |
| 7,480,282 B2 * | 1/2009 | Clune et al. | ................. 370/350 |
| 2002/0018002 A1 * | 2/2002 | Stippler | ................. 340/825.69 |

FOREIGN PATENT DOCUMENTS

| | | |
|---|---|---|
| DE | 198 31 405 A1 | 1/2000 |
| DE | 102 06 904 A1 | 9/2003 |
| DE | 10 2004 014 793 A1 | 10/2005 |
| EP | 1 178 632 A2 | 8/2001 |
| EP | 1 585 266 A2 | 3/2005 |

* cited by examiner

*Primary Examiner*—Chun-Kuan Lee
*Assistant Examiner*—Zachary K Huson
(74) *Attorney, Agent, or Firm*—DeMont & Breyer LLC

(57) ABSTRACT

The invention relates to a method and to a system for transmitting data of a data type to be transmitted cyclically and of a data type which can be transmitted acyclically via a common transmission channel from a first participant unit connected to the transmission channel to at least one further participant unit connected to the transmission channel. The invention proposes to develop a method based on a protocol-specific cyclic transmission sequence of transmission messages for transmitting data of a data type to be transmitted cyclically via a transmission channel. When a particular type of impending transmission message is detected for which redundant data of the data type to be transmitted cyclically are provided without new information content, instead of these data, data of a data type which can be transmitted acyclically are inserted into the data area provided for data of this data type to be transmitted cyclically.

15 Claims, 3 Drawing Sheets

Fig. 1

| Seq.no. | ... | Data area | ... |
|---|---|---|---|
| 000 | ... | Process data | ... |

| Seq.no. | ... | Data area | ... |
|---|---|---|---|
| 001 | ... | Process data | ... |

| Seq.no. | ... | Data area | ... |
|---|---|---|---|
| 010 | ... | Process data | ... |

| Seq.no. | ... | Data area | ... |
|---|---|---|---|
| 011 | ... | Process data | ... |

| Seq.no. | ... | Data area | ... |
|---|---|---|---|
| 100 | ... | Process data | ... |

| Seq.no. | ... | Data area | ... |
|---|---|---|---|
| 101 | ... | Process data | ... |

| Seq.no. | ... | Data area | ... |
|---|---|---|---|
| 110 | ... | Process data | ... |

Fig. 2

| Seq.no. | ... | Data area | ... |
|---------|-----|-----------|-----|
| 000 | ... | Process data | ... |

| Seq.no. | ... | Data area | ... |
|---------|-----|-----------|-----|
| 001 | ... | Process data | ... |

| Seq.no. | ... | Data area | ... |
|---------|-----|-----------|-----|
| 010 | ... | Process data | ... |

| Seq.no. | ... | Data area | ... |
|---------|-----|-----------|-----|
| 011 | ... | Process data | ... |

| Seq.no. | ... | Data area | ... |
|---------|-----|-----------|-----|
| 100 | ... | Process data | ... |

| Seq.no. | ... | Data area | ... |
|---------|-----|-----------|-----|
| 101 | ... | Process data | ... |

| Seq.no. | ... | Data area | ... |
|---------|-----|-----------|-----|
| 111 | ... | Diagnostic data | ... |

METHOD AND SYSTEM FOR TRANSMITTING DATA OF A DATA TYPE TO BE TRANSMITTED CYCLICALLY AND OF A DATA TYPE WHICH CAN BE TRANSMITTED ACYCLICALLY VIA A COMMON TRANSMISSION CHANNEL

FIELD OF THE INVENTION

The invention relates to a method and to a system for transmitting data of a data type to be transmitted cyclically and of a data type which can be transmitted acyclically via a common transmission channel from a first participant unit connected to the transmission channel to at least one further participant unit connected to the transmission channel.

BACKGROUND OF THE INVENTION

There are various fields of application for communication or transmission systems in which data of a certain data type are transmitted cyclically.

For example, there are fields of application in which the existence of a data transmission link of the communication or transmission system is continuously checked by cyclically transmitting data of a particular data type.

As a supplement or as an alternative, data of a data type to be transmitted cyclically in the fields of process control usually in each case comprise process-related process data which must be updated at regular intervals and provided for the participant units involved in the process via corresponding communication or transmission systems in order to control a particular process in accordance with the requirements.

Such process data are, for example, IN process data or process input data, cyclically detected by means of sensors such as, for example, sensors at a slave participant unit within a master-slave system, which are transmitted to a master participant unit for further processing, and OUT-process data or process output data, calculated by a master participant unit which, in turn, are transmitted to participant units communicating with actuators such as for example actuating elements and/or drives for correspondingly driving the actuators. As soon as such process data are relevant to a process to be controlled, they must be transmitted cyclically, in consequence. A particular relevance of such process data is found in applications in fields of safety engineering in which application-specific safety-related process input and/or process output data must be detected regularly via safety-related participant units and output via safety-related participant units, respectively, in order to be able to detect safety-critical errors during a process sequence which could also represent a hazard for human beings as early as possible and, if necessary, move an erroneous process or part-process into a safe state within short response times.

Data of a data type which can be transmitted acyclically are, for example, diagnostic data or acknowledgment data which are only transmitted when required or on request. When such data are transmitted, however, the times of the transmission of data of a data type to be transmitted cyclically such as, e.g. of process data, are usually changed and thus inadmissibly disturbed for many applications. Such a change of the times of the transmission of data of a data type to be transmitted cyclically is inadmissible, for example, in applications which require an equidistant transmission in time as is the case, in particular, in safety engineering. Furthermore, the worst-case response times of the transmission system are also usually extended by the transmission of data of an acyclic data type such as, for example, diagnostic data or also acknowledgement data, which is also of great relevance particularly in the fields of safety engineering. In addition, there is scarcely any more deterministic in the transmission of data via the transmission channel particularly if the same transmission path or channel is used for the transmission of data of a data type which can be transmitted acyclically as for the transmission of data of a data type to be transmitted cyclically.

SUMMARY OF THE INVENTION

It is an object of the invention to demonstrate an approach to the transmission of data of a data type which can be transmitted acyclically such as, for example, diagnostic data, during a particular application without disturbing the transmission of data of a data type to be transmitted cyclically, which are relevant to this particular application such as, e.g. process data relevant to the application of a process control.

According to the invention, it is thus provided to develop a method based on a protocol-specific cyclic transmission sequence of transmission messages for transmitting data of a data type to be transmitted cyclically via a transmission channel and to check for redundancy and currency, at least one particular position within the protocol-specific cyclic transmission sequence, the data of the data type to be transmitted cyclically, transmitted with the transmission message transmitted immediately before, with respect to the data of the data type to be transmitted cyclically which are provided for the immediately impending transmission message. When detecting such an impending transmission message for which redundant data of the data type to be transmitted cyclically are provided without new information content, instead of these data, data of a data type which can be transmitted acyclically are inserted into the data area provided for data of this data type to be transmitted cyclically.

In consequence, by specifying a particular point within the transmission sequence after which, if necessary, a transmission message with data of a data type which can be transmitted acyclically is transmitted, advantageously ensures that data of a data type which can be transmitted acyclically are transmitted only at a particular rank or within defined time slots within the protocol-specific cyclic transmission sequence. In this case, too, the equidistance and deterministic are retained during the transmission of data of the data type to be transmitted cyclically, particularly of process data since the receiving participant unit can also infer the redundant data of the data type to be transmitted cyclically but which have not been transmitted. In addition, it is ensured that the transmission of data of the data type which can be transmitted acyclically takes place with the same reliability as the data of the data type to be transmitted cyclically.

The invention also provides that the checking for redundancy and currency of data of a data type to be transmitted cyclically within a particular cyclic transmission sequence of transmission messages and the inserting of data of a data type which is to be transmitted acyclically within this cyclic transmission sequence of transmission messages is in each case carried out by the participant unit which produces or provides the data of the data type to be transmitted cyclically for this particular cyclic transmission sequence of transmission messages. Since there is thus no interposition of a further unit, e.g. of a master participant unit as checking and/or decision entity, any delay during the data transmission of a data type to be transmitted cyclically is essentially eliminated.

It is suitably provided to unambiguously assign to each transmission message a particular position within the protocol-specific cyclic transmission sequence and to check a transmission message received in each case for its assigned position. This provides a measure in a simple manner, during the protocol-specific cyclic transmission sequence of transmission messages, to check these with respect to a wrong order, a loss of an insertion and/or a repetition of transmission messages essentially with real-time capability, which is particularly appropriate for a safety-critical process particularly during the transmission of data of a safety-related data type to be transmitted cyclically during the application of the method.

A predetermined component is preferably inserted in the transmission message for marking and identifying the position assigned to a transmission message within a cyclic transmission sequence.

In a further suitable embodiment of the invention, it is also provided that during the transmission of the transmission message specified in the transmission sequence, which is also used for transmitting data of a data type which can be transmitted acyclically, the component predetermined for marking and identification for this transmission message, is replaced by another predetermined component in response to the insertion of data of a data type which can be transmitted acyclically.

This makes it possible for the marking and identification of a transmission of data of a data type which can be transmitted acyclically to take place without the use of additional marking bits.

According to a practical embodiment, it is also provided for this purpose that the number of predetermined components is calculated by the sum of the number of transmission messages to be transmitted in a transmission sequence and the number of transmission messages possible in this transmission sequence, which are also used for transmitting data of a data type which can be transmitted acyclically. This has the advantage that it is specified in a simple manner from the start in which cases within a transmission sequence there is any possibility of transmitting data of a data type which can be transmitted acyclically.

According to preferred embodiments, it is also proposed that coded sequence numbers are used as predetermined components, wherein, according to a preferred development for transmission messages which contain data of a data type which can be transmitted acyclically, a change of the coding is performed for the further simplified identification of such a transmission message.

By this means, the data simultaneously valid at this time but not changed, of the data type to be transmitted cyclically can also be implicitly transmitted by a transmission message which contains data of a data type which can be transmitted acyclically so that a gapless transmission also of the data of the data type to be transmitted cyclically occurs at the receiver of such a transmission message.

To detect errors near in time, it is also provided that the participant units form checking information via data received in each case and compare this information with checking information appended to the received data.

It is preferred that the process input or process output data are provided as data of a data type to be transmitted cyclically within a cyclic transmission sequence of transmission messages in dependence on the respective first participant unit and diagnostic, inquiry, response and/or acknowledgment data are generated as data of a data type to be transmitted acyclically.

The method according to the invention can thus be used, in particular, in communication or transmission systems for controlling processes or also part-processes.

The invention is thus suitable, in particular, also for transmission systems for transmitting process data which are safety-related for controlling safety-critical processes or part-processes so that, in particular, a transmission system with safety-related participant units adapted for the carrying-out is provided for carrying out the method according to the invention.

In particular, it is provided that such a transmission system is constructed with at least one participant unit which is adapted for transmitting transmission messages with data of a data type to be transmitted cyclically within a protocol-specific cyclic transmission sequence of such transmission messages to at least one further participant unit connected to a transmission channel and for inserting a predefined component into the transmission message to be transmitted in each case for unambiguously marking and identifying the transmission message within the protocol-specific cyclic transmission sequence. This at least one participant unit adapted in this manner is further adapted for performing, in response to the completed transmission of at least one particular transmission message transmitted in each case at the same position within the transmission sequence, a check of the data of the data type to be transmitted cyclically which are provided for the transmission message to be transmitted next in the transmission sequence with respect to the data of the data type to be transmitted cyclically of this particular transmission message, for redundancy and currency, and for generating data of a data type to be transmitted acyclically and for inserting these data instead of the checked data of the data type to be transmitted cyclically into the data area provided for these data in response to the detection of the checked data as redundant data without new information content.

With respect to application, such participant units can be constructed, e.g. as a master or slave.

BRIEF DESCRIPTION OF THE DRAWINGS

These and other features and other associated advantages of the invention can be obtained from the subsequent description of a preferred, but only exemplary embodiment, referring to the attached drawings, in which:

FIG. 1 shows a sketch of a cycle of an exemplary protocol-specific cyclic transmission sequence of transmission messages with process data to be transmitted cyclically, embedded therein, in a data area provided for the transmission of data of a data type to be transmitted cyclically.

FIG. 2 shows a cycle of the exemplary protocol-specific cyclic transmission sequence according to FIG. 1, but with a transmission message within the sequence which, according to the invention, contains in the data area provided for the transmission of data of the data type to be transmitted cyclically, instead of data of this data type, data of a data type which can be transmitted acyclically.

DETAILED DESCRIPTION

Figure 3:
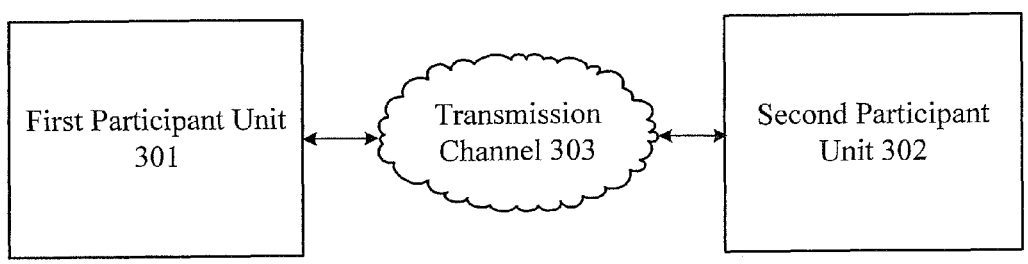
FIG. 3 shows a communication system according to the invention.

FIG. 1 shows a sketch of a cycle according to the invention of a protocol-specific cyclic transmission sequence of transmission messages for transmitting data of a data type to be transmitted cyclically within a data area provided for this purpose, according to a present example for the cyclic transmission of process data, via a transmission channel, not shown, from a first participant unit (not shown) connected to the transmission channel to at least one further participant unit (not shown) connected to the transmission channel.

The transmission messages transmitted within such a transmission sequence contain a sequential number coded by three bits via which the position or the time slot within a respective cyclic transmission sequence is unambiguously identified. In consequence, in principle, such three-bit coding, i.e. from "000" to "111" corresponds to the sequence numbers 0 to 7 so that a number of 8 sequence numbers is given.

In principle, 8 transmission messages would thus be transmitted cyclically successively as follows: 0, 1, 2, 3, 4, 5, 6, 7, 0, 1, 2, 3, 4, 5, 6, 7, . . . or, on the basis of the three-bit coding, 000, 001, 010, 011, 100, 101, 110, 111, 000, 001, 010, 011, 100, 101, 110, 111, . . . .

In order to transmit, according to the invention, data of a data type which can be transmitted acyclically such as, e.g. diagnostic data, to a particular time slot or at a predetermined position within the transmission sequence, respectively, as shown in FIG. 2, the number of sequence numbers has been reduced to 7.

According to FIG. 1, the three-bit coding "000" thus still corresponds to the sequence number 0 and marks the first transmission message with process data in a transmission sequence of transmission messages. The three-bit codings "001", "010", "011", "100", "101" and "110" correspond to the sequential number 1, 2, 3, 4, 5 and 6, respectively and, in consequence, mark the second, third, fourth, fifth, sixth and seventh transmission message with process data within a respective transmission sequence of transmission messages with process data.

According to FIG. 1, these 7 transmission messages are thus transmitted cyclically successively as follows: 0, 1, 2, 3, 4, 5, 6, 0, 1, 2, 3, 4, 5, 6, . . . or, on the basis of the three-bit coding 000, 001, 010, 011, 100, 101, 110,000, 001, 010, 011, 100, 101, 110, . . . , without the transmission of data of a data type which can be transmitted acyclically.

If the process data provided by the transmitting participant unit do not then change from sequence number 5 to sequence number 6, data of a data type which can be transmitted acyclically such as, e.g. request data, acknowledgment data, diagnostic data or of another acyclically transmissible data type, generated by this participant unit, can be transmitted with sequence number 6.

To mark a transmission of such data of a data type which can be transmitted acyclically, the sequential number 6 of the seventh transmission message is coded as "111" in this transmission sequence as shown in FIG. 2 for the transmission of diagnostic data. The transmission message transmitted as sequence number 6 coded "111" thus contains diagnostic data and additionally implicitly the process data valid at this time.

In the present exemplary embodiment, the component, provided for marking the transmission of data of a data type which can be transmitted acyclically, of a transmission message defined for this purpose in the transmission sequence thus follows by changed coding, i.e. without using additional bits, in dependence on the sequential number for marking and identifying a respective transmission message during a transmission sequence. In the present example, the possibility for transmitting data of a data type which can be transmitted acyclically thus only exists in one of $2^3$ cases which, particularly in the case of safety-related process data to be transmitted cyclically is used for further prioritizing such process data. The real-time-capability in safety-related protocols such as, e.g. in the case of the INTERBUS safety protocol, is thus always retained.

If there were a transmission of data of a data type which can be transmitted acyclically also between two other sequential numbers not previously defined in which the process data have not changed, the safety measure "sequential number", for example, would not be able to have an effect and, as a rule, the system would then switch off. In detail, the safety measure "consecutive number" is used, in particular against a wrong order, against the insertion, against the loss and/or against the repetition or transmission messages within a cycle of the protocol-specific cyclic transmission sequence.

Furthermore, such a data transmission according to the invention guarantees the same safety as the cyclic data transmission of process data during the transmission of data of a data type which can be transmitted acyclically. In addition, in the case of changing data of the data type to be transmitted cyclically, only such data are transmitted and thus no data of a data type which can be transmitted acyclically. In consequence, high protection against corruption of data is still given.

In general, the invention thus comprises embodiments in which, by changing the coding, particular components of the transmission messages are used for forming a distinguishing characteristic whether data to be transmitted cyclically, that is to say, in particular, process data, or acyclically transmissible data such as, e.g. inquiry, response, acknowledgment and/or diagnostic data are transmitted in the respective transmission message. Although this reduces the range of values which could be represented originally by the components, which must suitably be taken into consideration in the choice of components. On the other hand unchanged process data are implicitly also always transmitted in this way to the receiving participant unit in the transmission of data of a data type which can be transmitted acyclically so that a gapless transmission of process data is thus always ensured for it.

The present invention is thus used, in particular, in communication or transmission systems used in safety engineering such as, for example, the Interbus safety system, with safety-related participant units. FIG. 3 shows a communication system comprising participant units 301 and 302, and transmission channel 303, interconnected as shown.

Suitably, a message area is thus also provided in each case in each transmission message for appending checking information so that receiving participant units, for the purpose of detecting errors near in time, form checking information via the data in each case received by means of such a transmission message and can compare these with the check sum appended to the received data. For this purpose, a CRC method known per se can be used, for example.

The further structure of a transmission message can thus vary depending on the application within the scope of the invention.

If different protocol-specific cyclic transmission sequences of transmission messages are carried out for transmitting data to be transmitted cyclically via a transmission channel in order to transmit, e.g. data provided from two different participant units or to transmit data provided from a participant unit to different further participant units, further message areas can be provided for inserting identifications identifying these different transmission sequences into the transmission messages.

The checking for redundancy and currency of data of a data type to be transmitted cyclically within a particular cyclic transmission sequence of transmission messages and the inserting of data of a data type to be transmitted acyclically within this cyclic transmission sequence of transmission messages is preferably done in each case by the participant unit which also produces or provides the data of the data type to be transmitted cyclically for this particular cyclic transmission sequence of transmission messages. Since there is thus no interposition of a further unit, e.g. of a master participant unit as checking and/or deciding entity, any delay during the data transmission of a data type to be transmitted cyclically is essentially eliminated.

Such a participant unit which can be, e.g. a master unit or a slave unit is thus suitably constructed for carrying out the invention, for transmitting transmission messages with data of a data type to be transmitted cyclically within a protocol-specific cyclic transmission sequence of such transmission messages to at least one further participant unit connected to a transmission channel and for inserting a predefined component into the transmission message to be transmitted in each case for unambiguously marking and identifying the transmission message within the protocol-specific cyclic transmission sequence. It is also constructed for checking, for redundancy and currency, the data of the data type to be transmitted cyclically which are provided for the transmission message to be transmitted next in the transmission sequence, in response to the completed transmission of at least one particular transmission message in each case transmitted at the same position within the transmission sequence, with respect to the data of the data type to be transmitted cyclically of this particular transmission message, generating data of a data type which can be transmitted acyclically and inserting these data instead of the checked data of the data type to be transmitted cyclically into the data area provided for this data type in response to the detection of the checked data as redundant data without new information content.

What is claimed is:

1. A method for transmitting data of a data type to be transmitted cyclically and data of a data type which can be transmitted acyclically via a common transmission channel from a first participant unit connected to the transmission channel to at least one further participant unit connected to the transmission channel, the method comprising:
executing a protocol-specific cyclic data transmission for transmitting at least one protocol-specific cyclic transmission sequence of transmission messages with data of the data type to be transmitted cyclically;
for each protocol-specific cyclic transmission sequence of transmission messages, at least one particular position within the protocol-specific cyclic transmission sequence, checking the data of the data type to be transmitted cyclically, transmitted with the transmission message transmitted immediately before, for redundancy and currency with respect to the data of the data type to be transmitted cyclically which are provided for the immediately impending transmission message; and
when such an impending transmission message is detected, for which redundant data of the data type to be transmitted cyclically are provided without new information content, inserting, instead of these data, data of a data type which can be transmitted acyclically, into a data area provided for the data of the data type to be transmitted cyclically.

2. The method as claimed in claim 1, wherein furthermore the checking for redundancy and currency of data of a data type to be transmitted cyclically within a particular cyclic transmission sequence of transmission messages and the inserting of data of a data type which can be transmitted acyclically within this cyclic transmission sequence of transmission messages is in each case carried out by the participant unit which provides the data of the data type to be transmitted cyclically for this particular cyclic transmission sequence of transmission messages.

3. The method as claimed in claim 1, wherein a particular position is unambiguously assigned to each transmission message within the protocol-specific cyclic transmission sequence and received transmission messages are checked for their assigned position.

4. The method as claimed in claim 3, wherein a predetermined component is inserted in the transmission message for marking and identifying the position assigned to a transmission message within a cyclic transmission sequence.

5. The method as claimed in claim 4, wherein furthermore for the transmission of the impending transmission message downstream of the particular position in the transmission sequence, which is also used for transmitting data of a data type which can be transmitted acyclically, the component predetermined for marking and identification for this transmission message, is replaced by another predetermined component before the transmission in response to the insertion of acyclic data.

6. The method as claimed in claim 4, wherein furthermore the number of predetermined components is calculated by the sum of the number of transmission messages to be transmitted in a transmission sequence and the number of transmission messages possible in this transmission sequence, which are also used for transmitting data of a data type which can be transmitted acyclically.

7. The method as claimed in claim 4, wherein furthermore coded sequence numbers are used as predetermined components.

8. The method as claimed in claim 4, wherein furthermore, for transmission messages which contain data of a data type which can be transmitted acyclically, the change of coding of the predetermined component of this transmission message is carried out for identifying a transmission of data of a data type which can be transmitted acyclically.

9. The method as claimed in claim 1, wherein furthermore the participant units form checking information via data received in each case and compare this information with checking information appended to the received data.

10. The method as claimed in claim 1, wherein furthermore process input or process output data are provided as data of a data type to be transmitted cyclically within a cyclic transmission sequence of transmission messages in dependence on the respective first participant unit and at least one of diagnostic, inquiry, response and acknowledgement data are generated as data of a data type which can be transmitted acyclically.

11. The method as claimed in claim 1, which is used in controlling a safety-critical process.

12. A transmission system for transmitting, via a common transmission channel, data of a data type to be transmitted cyclically and data of a data type which can be transmitted acyclically, the transmission system comprising:
1) a first participant unit, connected to the transmission channel, for
a) executing a protocol-specific cyclic transmission for transmitting at least one protocol-specific cyclic transmission sequence of transmission messages with data of the data type to be transmitted cyclically, wherein the transmission messages are intended for at least one further participant unit connected to the transmission channel,
b) for each protocol-specific cyclic transmission sequence of transmission messages, at least one particular position within the protocol-specific cyclic transmission sequence, checking the data of the data type to be transmitted cyclically, transmitted with the transmission message transmitted immediately before, for redundancy and currency with respect to the data of the data type to be transmitted cyclically which are provided for the immediately impending transmission message, and c) when such an impending transmission message is detected, for which redundant data of the data type to be transmitted cyclically are provided without new information content, inserting, instead of these data, data of a data type which can be transmitted acyclically, into a data area provided for the data of the data type to be transmitted cyclically; and 2) said at least one further participant unit.

13. The transmission system as claimed in claim 12, wherein at least one participant unit in the transmission system is constructed for transmitting transmission messages with data of a data type to be transmitted cyclically within a protocol-specific cyclic transmission sequence of such transmission messages to at least one further participant unit connected to a transmission channel, for inserting a predefined component into the transmission message to be transmitted in each case for unambiguously marking and identifying the transmission message within the protocol-specific cyclic transmission sequence, in response to the completed transmission of at least one particular transmission message transmitted in each case at the same position within the transmission sequence, for checking for redundancy and currency of the data of the data type to be transmitted cyclically which are provided for the transmission message to be transmitted next in the transmission sequence with respect to the data of the data type to be transmitted cyclically of this particular transmission message, for generating data of a data type which can be transmitted acyclically, and for inserting these data instead of the checked data of the data type to be transmitted cyclically into the data area provided for these data in response to the detection of the checked data as redundant data without new information content.

14. The transmission system as claimed in claim 12, in which a respective participant unit in the transmission system is constructed as a master or slave.

15. The transmission system as claimed in claim 12, in which a respective participant unit in the transmission system is constructed as safety-related participant unit.

* * * * *